110-224
SR
OR RE 446

M. Thompson.
Furnace.

RE No. 446. Reissued Mar. 31. 1857.

BEST AVAILABLE COPY

UNITED STATES PATENT OFFICE.

MOSES THOMPSON, OF NEW YORK, N. Y.

IMPROVEMENT IN FURNACES FOR BURNING WET FUEL.

Specification forming part of Letters Patent No. 12,678, dated April 10, 1855; Reissue No. 398, dated October 7, 1856; Reissue No. 416, dated March 31, 1857.

*To all whom it may concern:*

Be it known that I, MOSES THOMPSON, formerly of Henrico county, and State of Virginia, and more recently of New Orleans, in the State of Louisiana, but now of the city and State of New York, have invented new and useful improvements in burning tan-bark, bagasse, sawdust, and other kinds of fuel in a wet state, for the purpose of creating heat to generate steam, or to be employed in heating or drying operations; and I hereby declare that the following is a full, clear, and exact description of the same, reference being had to the accompanying drawings, forming part of this specification, in which—

Figure 1:
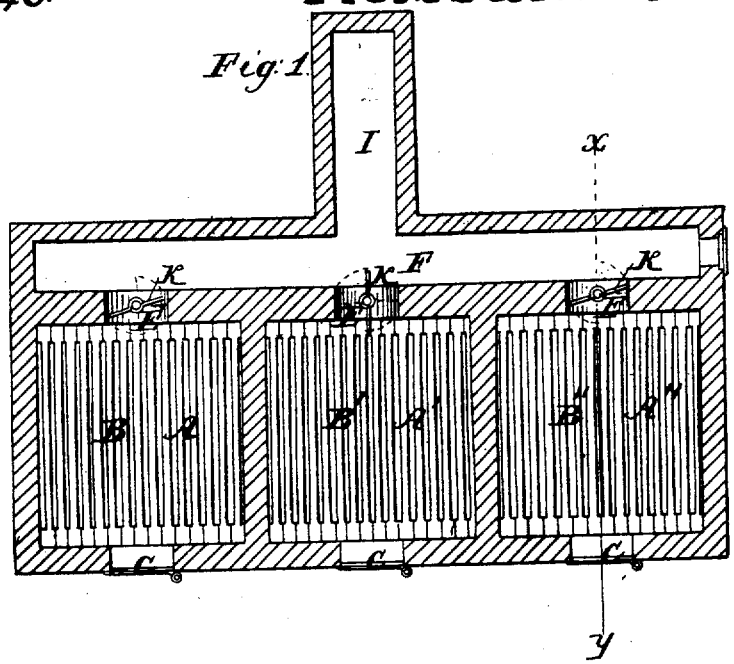
Figure 2:
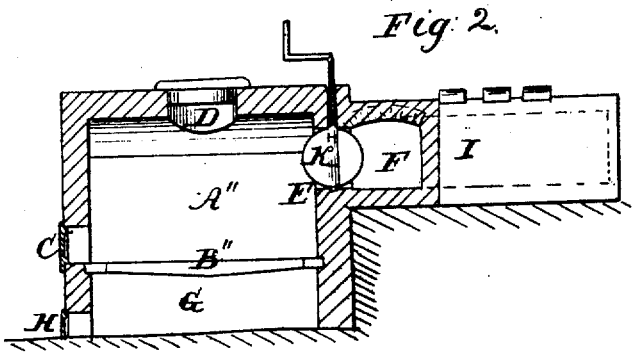

Figure 1 is a horizontal section of a furnace constructed according to my invention. Fig. 2 is a vertical section of the same in the line *x y* of Fig. 1.

Similar letters of reference indicate corresponding parts in the several figures.

The main object of my invention is to effect the more economical use for fuel of tan-bark, bagasse, or other trashy matters in a wet state, or very green or wet wood.

To enable others skilled in the art to understand and use my invention, I will proceed to describe its construction and operation.

The furnace shown in the drawings has three fire-chambers, A A′ A″. Three is the number shown, as I consider that number in many cases to be best adapted to practical operation. In some cases two may be sufficient, and in others more or less. In making these variations as to the number of chambers the builder is to be guided by the quantity of heat required, size of chambers, and character of fuel to be used. The fire-chambers are of a square, but may be of other form, with grate bottoms B B′ B″ and arched tops, or said tops may be used or built of any other form adapted to the kind of fuel to be used. They are separated by a wall of fire-proof material, and lined throughout with fire-brick, and in case of burning wet tan or bagasse fire-brick grates should be used. Each burning-chamber is provided with a door, C, in front, for the purpose of lighting and tending the fire, with an opening, D, at the top, for the purpose of supplying the fuel, and with an opening, E, at the back end of the chamber, which leads to the flue F or the mixing-chamber. The opening may be provided with a damper, K. Each fire-chamber has a separate ash-pit, G, below it, which is furnished with a door, H, to regulate the admission of air. The flue or mixing-chamber F extends across the back of all the three fire-chambers, and the chimney may be at one end, or may be placed in the rear, with the flue I leading to it from the flue F.

If the furnace is used for generating steam, the best place for the boiler will be in flue I, which will be made of a proper size to receive and nearly surround it. If used for other purposes, any arrangement may be made best adapted to the application of said heat. The thing to be heated ought to be placed a little above the inside top of the mixing-chamber. The current from the mixing-chamber, in passing to the place of use, should descend or pass under a bridge to the place of use equal to about one-half of the depth of the mixing-chamber, then rise to the place of use. In case of nearly dry fuel—such as green wood and sawdust—the current should rise immediately after leaving the burning-chambers through the mixing-chamber to the place of use, and the flue E, leading out of the fuel-chamber A into the flue or mixing-chamber F, should be increased to about threefold capacity of that used for very wet fuel, to be varied in proportion to the wetness or dryness of said fuel. In case of burning of sawdust or green or wet wood, the chambers should be about double the grate-surface of what is commonly used for burning of wood to accomplish the same object; but for wet tan it should be increased to about fourfold, and in case of burning bagasse it should be increased about sixfold and the height of the chamber increased, so that the grate may be covered by feeding at the top.

The mode of conducting the operation of the furnace is as follows: Fires being lighted in all the fire-chambers with dry fuel and the masonry heated to a high degree, two of the three chambers, A A′, are fed with wet fuel and have their ash-pits closed and the damper K K partially closed, though this latter is not absolutely necessary. The other fire-chamber, having its charge partially dry, in the meantime has the damper K open and the door of the ash-pit H opened far enough to admit any quantity of air which may be required to promote such a degree of combustion as may be necessary to generate the amount of heat required. There should be no artificial blast, and if a high stack be used there should be a damper in it to moderate the draft. When the fuel in the open chamber is reduced to a desirable degree, its ash-pit is closed and the chamber recharged, and another opened and supplied with air until the fuel within is reduced, when it is closed, recharged, and another opened, each in its turn being opened and supplied with air to generate and supply the requisite amount of heat and carbonaceous gases, while the others are closed and successively supplied with fresh fuel to heat and decompose the same to such a degree as is desirable before allowing rapid combustion to take place. Each fire-chamber should be supplied successively with fuel at proper intervals by any convenient means, either through the hole D or door C in front.

The principal advantage of a furnace and process of this description consists in heating the wet charge without unnecessary waste of heat, decomposing it into such gases as will, when mingled in the mixing-chamber with the products of combustion from the active chamber, cause the most perfect combustion of the gases and smoke to be effected. This perfect combustion could not be effected in a single fire-chamber; but when two or more fire-chambers are employed no interruption takes place and the object is readily attained. Another advantage consists in always holding a certain quantity of heat and highly-heated fuel in reserve in the closed chambers, which may be immediately brought into action by opening one or more of the chambers. A similar but inferior result might be produced by having several grates and ash-pits to the same fire-chamber, each grate charged successively, and its ash-pit for the time closed immediately after fresh charging to exclude the air. I have described this in my caveat, on which my application is based, but do not use it because of its inferiority in practice, although it involves my principle.

After ample experiments I have discovered that any results which can be produced by the use of dry fuel are inferior to wet in proportion to quantity used, and that results like mine can only be attained by the use of wet fuel, similar to what I have herein mentioned, fed into an intensely-heated chamber. Under such circumstances the water in the fuel in the presence of the carbonaceous substances in the furnace will be decomposed, giving its oxygen to the carbonaceous matter, dispensing with a draft and its cooling and wasteful influence, and rendering the combustion so perfect that no smoke is visible.

In burning tan and sawdust where a large quantity of heat is to be made, in order to save the increase of their number I put the chambers in twice as long as wide, and use two openings, D, to feed through, and thereby accomplish double to each chamber.

I do not claim the within-described arrangement of a series of fire-chambers to communicate with one common flue irrespective of the purpose for which, and the manner in which, I employ the said arrangement; but What I do claim as my invention, and desire to secure by Letters Patent, is—

1. Using green bagasse, wet tan, wet sawdust, and other wet carbonaceous or vegetable substances as fuel for the production of intense heat by mingling the gases issuing from a highly-heated mass thereof with those arising from carbonaceous combustion by the intervention of a flue or chamber, with which the chamber or chambers containing the fire and charge of wet substances communicate, and in which said gases meet, mingle, and consume each other on their way to the apparatus to be heated and to the stack.

2. The combustion, for the purposes of a high degree of heat, of bagasse, refuse tan, sawdust, and other wet refuse substance, or very wet and green wood, by the employment of a series of fire-chambers arranged in any manner, substantially as described, to communicate with one common flue or mixing-chamber, when any number of said chambers are nearly closed to the admission of air when first charged, as described, while the remaining chamber or chambers are in full communication with the mixing-chamber and have a proper supply of air admitted, and the ash-pit of each chamber in its turn is nearly closed and then opened and has air admitted, whereby the heat required is rendered continuous and comparatively uniform, while the fuel in some of the chambers is being heated and decomposed and its gases sent forward to the mixing-chamber to any desirable degree, as herein set forth.

MOSES THOMPSON.

Witnesses:

JOHN J. MURRAY,
HENRY FARRINGTON.